United States Patent [19]
Itoh et al.

[11] Patent Number: 5,581,066
[45] Date of Patent: Dec. 3, 1996

[54] MULTIPLE-ROW BAR CODE READING APPARATUS

[75] Inventors: Motohiko Itoh; Hiroaki Kawai; Mitsuo Watanabe, all of Kawasaki, Japan

[73] Assignee: Fujitsu Limited, Kawasaki, Japan

[21] Appl. No.: 492,869

[22] Filed: Jun. 20, 1995

Related U.S. Application Data

[63] Continuation of Ser. No. 88,334, Jul. 9, 1993, abandoned.

[30] Foreign Application Priority Data

Sep. 26, 1992 [JP] Japan ..................... 4-280924

[51] Int. Cl.⁶ ..................................... G06K 7/10
[52] U.S. Cl. ........................... 235/463; 235/462
[58] Field of Search .................... 235/462, 463, 235/494, 470, 435, 436, 437, 438, 472, 467

[56] References Cited

U.S. PATENT DOCUMENTS

| | | | |
|---|---|---|---|
| 4,794,239 | 12/1988 | Allais | 235/462 |
| 5,189,289 | 2/1993 | Watanabe | 235/437 |
| 5,235,172 | 8/1993 | Oehlmann | 235/494 |
| 5,243,655 | 9/1993 | Wang | 235/462 X |

*Primary Examiner*—Donald T. Hajec
*Assistant Examiner*—Karl D. Frech
*Attorney, Agent, or Firm*—Staas & Halsey

[57] ABSTRACT

A detecting and decoding circuit detects and decodes a multiple-row bar code consisting of n rows, each of which has a left block and a right block. A bar code data editing circuit extracts one bar code data a decoded signal received from the detecting and decoding circuit and performs a modulo 10 check for the bar code data. In addition, a determination circuit receives the edited result of the bar code data editing circuit and determines whether or not the number of each of right block data and left block data is n, whether or not the number of valid data in the modulo 10 check is n, whether or not the number of sequence data is n−1, and whether or not any two data of each of the left block data and the right block data are not the same as each other, and for outputting a reading valid signal when all these conditions are satisfied.

12 Claims, 15 Drawing Sheets

MULTIPLE-ROW BAR CODE READING APPARATUS

This application is a continuation of application Ser. No. 08/088,334, filed Jul. 9, 1993, now abandoned.

BACKGROUND OF THE INVENTION

1. Field of the Invention

The present invention relates to a bar code reader for detecting a bar code signal and for reading a bar code. In particular, the present invention relates to a multiple-row bar code reading apparatus for reading a bar code consisting of a plurality of rows each of which has left and right blocks, like EAN code.

In recent years, bar code systems, including multiple-row bar code systems have been used in various fields such as supermarkets.

A conventional bar code reader which reads a multiple-row bar code, consisting of n rows each of which having left and right blocks, determines whether or not the multiple row bar code is sequence data. When the bar code is sequence data, the bar code reader treats the sequence data as data to sequentially read. The sequence data also contains valid data for a modulo 10 check.

2. Description of the Related Art

FIG. 1 is a block diagram showing a conventional bar code reading apparatus which reads a bar code consisting of n rows. In FIG. 1, reference numeral 2 is a laser generating portion. The laser generating portion 2 radiates laser light (namely, a laser beam) onto the surface of a substance (for example, a merchandise item) on which a bar code 1 consisting of n rows is disposed. To read the bar code 1, the spot of the laser light is moved. The laser light is reflected at the bar code 1. The reflected light is exposed to a detector 3. The detector 3 generates a signal corresponding to black and white portions of the bar code as a reception signal. In addition, light reflected from other than the bar code 1 is also exposed to the detector 3. The reception signal is sent to a binary forming circuit 4. The binary forming circuit 4 converts the reception signal into binary data.

FIG. 2 is a schematic diagram for explaining the binary-formation of a bar code. A bar code consists of black bars and white bars. For example, when the detector 3 detects a black bar, it outputs a high (H) level pulse. In contrast, when the detector 3 detects a white bar, it outputs a low (L) level pulse. As shown in FIG. 2, the binary forming circuit 4 outputs binary pulses corresponding to the bar code being read.

The binary pulses are sent to a bar width counter 5. The bar width counter 5 calculates the width of each pulse received from the binary forming circuit 4. In other words, the bar width counter 5 counts the number of clock pulses after the leading edge of a binary pulse takes place until the trailing edge thereof takes place and the number of clock pulses after the trailing edge of a binary pulse takes place until the leading edge of the next binary pulse takes place. FIG. 3 is a schematic diagram for explaining digitization of the bar width counter 5. In the FIG. 3, the bar width counter 5 counts four clock pulses in a first H level. Next, the bar width counter 5 counts eight clock pulses in the subsequent L level. The bar width counter 5, however, counts eight clock pulses in a second H level.

The digitized data formed by the bar width counter 5 is sent to a bar code detecting portion 6. The bar code detecting portion 6 retrieves bar code data from the digitized data. When a bar code is read by radiating laser light thereon, the laser light is also radiated to other portions. The bar code detecting portion 6 detects laser light which is reflected from the bar code region.

The bar code data extracted by the bar code detecting portion 6 is sent to a bar code data decoding portion 7. The bar code data decoding portion 7 decodes the bar code data into numeric data of the bar code. The numeric data of the bar code is sent to a bar code data editing portion 8 and a sequence data detecting portion 9.

The sequence data detecting portion 9 determines whether or not the currently decoded bar code data is continued to bar code data which has been decoded just before.

FIG. 4 is a schematic diagram for explaining a multiple-row bar code. Each row of a bar code has a left block and a right block. Between the left block and the right block, a center bar is located. Outside the left and right blocks, guard bars are located. To read such a bar code, for example, after the left block is decoded, the right block is decoded. However, the decoding may be performed in the reverse order (namely, from the right block to the left block). The case in which the decoding is performed from the left block to the right block is described below. In FIG. 4, the right block date and the left block data are decoded in sequence. These data are referred to as sequence data.

The sequence data detecting portion 9 detects such sequence data and sends the detected result to the bar code data editing portion 8. The bar code data editing portion 8 includes a modulo 10 check circuit which performs a modulo 10 check for the input data. The bar code data editing portion 8 combines the decoded data of the left and right blocks so as to form one bar code data. The modulo 10 check circuit performs the modulo 10 check for the combined data. The result is sent to a determination portion 10.

Bar codes corresponding to JAN, EAN, and UPC systems have check digit data for checking whether or not their decoded values are valid. When the check digit data is valid, it is named valid data in the modulo 10 check. Next, a method for calculating the check digit data will be described.

At step ST1, all the values of even-digit characters starting from the second least significant digit are summed. At step ST2, the result of the step ST1 is tripled. At step ST3, all the values of odd-digit characters starting from the third least significant digit are summed. At step ST4, the result of the step ST2 and the result of the step ST3 are added. At step ST5, a multiple of 10 which is larger than and most close to the result of the step ST4 is calculated. The difference between the result of the step ST5 and the result of the step ST4 is the value of the check digit data. If the value of the check digit data is equal to the value of the least significant digit, the bar code data is treated as valid data in the modulo 10 check.

For example, when the bar code character value is 2018189166101, the value of the least significant digit "1" is a check digit value.

At the step ST1, 0+6+1+8+8+0=23 is obtained.

At the step ST2, 23×3=69 is obtained.

At the step ST3, 1+6+9+1+1+2=20 is obtained.

At the step ST4, 69+20=89 is obtained.

At the step ST5, 90−89=1 is obtained.

The determination portion 10 comprises detecting portions 10-1 and 10-2. The detecting portion 10-1 detects whether or not the number of valid data in the modulo 10 check is n or more. The detecting portion 10-2 detects whether or not the number of sequence data is n. When all these conditions are satisfied, the determination portion 10 treats n sequence data as validly read data. With the above-described process, the conventional bar code reader checks whether or not a multiple-row bar code being read is valid.

As described above, in the conventional bar code reader, all bar code data consisting of n rows each of which has left and right blocks should be sequence data. In addition, the bar code data should be valid data in the modulo 10 check. However, when each row of bar code data consisting of n rows is sequence data, the area to which the laser beam is radiated becomes narrow, thereby deteriorating the reading efficiency. For example, in FIG. 4, when the laser beam is moved in a slant direction, with one movement of the laser beam, both the left and right blocks of a row of a bar code cannot be read at one time, resulting in a reading error (namely, no good reading). And if non-sequence data are permitted, in the case where a bar code is read by moving a laser beam in a grid pattern, even if both left and right blocks on different rows are correctly read, a reading error takes place. In addition, when bar code data is erroneously read, the erroneous data may be output corresponding to only sequence data.

SUMMARY OF THE INVENTION

The present invention relates to a bar code reading apparatus for reading a bar code consisting of a plurality of rows each of which has a right block and a left block. In particular, the present invention relates to a multiple-row bar code reading apparatus with high reading efficiency to decrease occurrences of erroneous reading.

The present invention is a multiple-row bar code reading apparatus, comprising a detecting and decoding circuit for detecting and decoding a multiple-row bar code consisting of n rows, each of which has a left block and a right block, a bar code data editing circuit for extracting one bar code data from a decoded signal received from the detecting and decoding circuit and for performing modulo 10 check for the bar code data, and a determination circuit for receiving the edited result of the bar code data editing circuit. The present invention then determines whether or not the number of each of right block data and left block data is n, whether or not the number of valid data in the modulo 10 check is n, whether or not the number of sequence data is n−1, and whether or not any two data each of the left block data and the right block data in the valid data of the modulo 10 check are not the same as each other. The present invention then outputs a reading valid signal when all of these conditions are satisfied.

In addition, the determination circuit is adapted for determining the number of valid data in the modulo 10 check and the number of sequence data and for outputting a valid signal or an invalid signal corresponding to the determined result.

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 5:
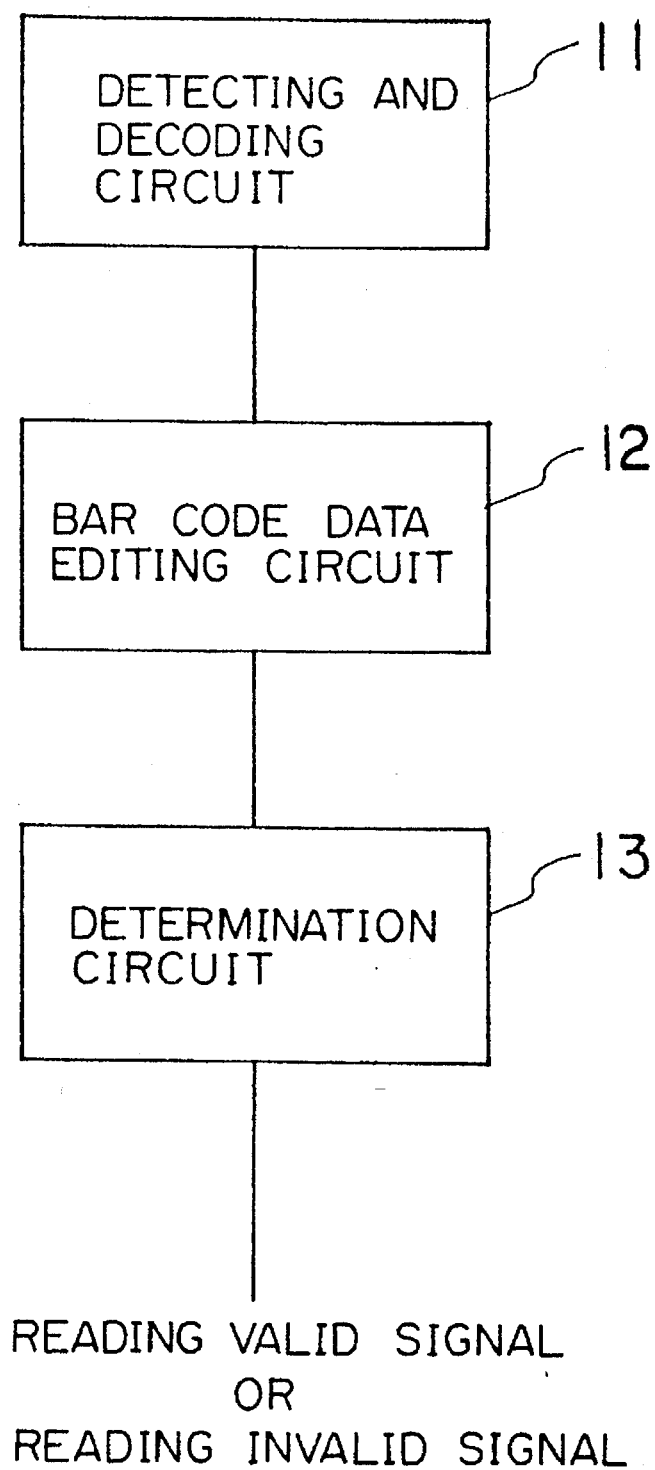
FIG. 5 is a block diagram showing the theory of the present invention.

FIG. 5 is a block diagram showing the theory of the present invention. Reference numeral 11 is a detecting and decoding circuit 11. The detecting and decoding circuit 11 detects and decodes a multiple-row bar code consisting of n rows each of which has a left block and a right block. For example, a signal supplied to the detecting and decoding circuit 11 is generated by scanning a laser beam on a bar code in a grid pattern.

The decoded signal is supplied to a bar code data editing circuit 12. The bar code data editing circuit 12 obtains bar code data of left and right blocks and performs the modulo 10 check for the bar code data. The result is sent to a determination circuit 13.

The determination circuit 13 receives the edited result from the bar code data editing circuit 12 and preforms the following seven types of determining processes:

(1) The determination circuit 13 determines whether or not the number of each of left and right block data is n whether or not the number of valid data in the modulo 10 check is n, whether or not the number of sequence data is n−1, whether or not any two data of the left block data in the valid data of the modulo 10 check are not the same as each other, and whether or not two data of the right data in the valid data of the modulo 10 check are not the same as each other. When all of these conditions are satisfied, the determination circuit 13 treats the bar code data as validly read data.

(2) The determination circuit 13 determines whether or not the number of valid data in the modulo 10 check is n, whether or not the number of sequence data is n−1, whether or not the number of left or right block data is n+1 and the number of right or left block data is n, and whether or not the remaining data which is invalid data in the modulo 10 check differs from the other data by one character in decoded values. When all of these conditions are satisfied, the determination circuit 13 treats the bar code data as validly read data.

(3) the determination circuit 13 determines whether or no the number of valid data in the modulo 10 check is n, whether or not the number of sequence data is n. When all of these conditions are satisfied, the determination circuit 13 treats the bar code data as validly read data.

(4) The determination circuit 13 determines whether or not the number of valid data in the modulo 10 check is in the range from n+1 to a predetermined value and whether or not the number of sequence data is n. When all of these conditions are satisfied, the determination circuit 13 treats the bar code data as validly read data.

(5) The determination circuit 13 determines whether or not the number of valid data in the modulo 10 check is n and whether or not the number of left or right block data is n+2 or more. When all of these conditions are satisfied, the determination circuit 13 treats the bar code data as invalidly read data.

(6) The determination circuit 13 determines whether or not the number of valid data in the modulo 10 check is n, whether or not the number of sequence data is n−1, and whether or not the number of each of right and left block data is n+1 or more. When all of these conditions are satisfied, the determination circuit 13 treats the bar code data as invalidly read data.

(7) The determination circuit 13 determines whether or the number of valid data in the modulo 10 check is more than the predetermined value. When this condition is satisfied, the determination circuit 13 treats the bar code data as invalidly read data.

The circuit shown in FIG. 5 operates as explained below.

The detecting and decoding circuit 11 decodes bar code data being read (for example, by scanning a bar code with a laser beam or the like). The bar code data editing circuit 12 edits left block data and right block data and determines whether or not the result of the modulo 10 check is valid. Corresponding to the above-described seven types of determination processes, the determination circuit 13 obtains the numbers of valid data in the modulo 10 check from the left block data and right block data, the number of sequence data, the numbers of left block data and right block data, and the accordance of left block data and right block data.

In the present invention, there are seven types of processes for determining validity or invalidity of data being read corresponding to the results of the modulo 10 check, the sequence data, the left and right block data, and so forth. Thus, in addition to accurate reading check, the ratio of erroneous reading can be decreased.

Figure 6:
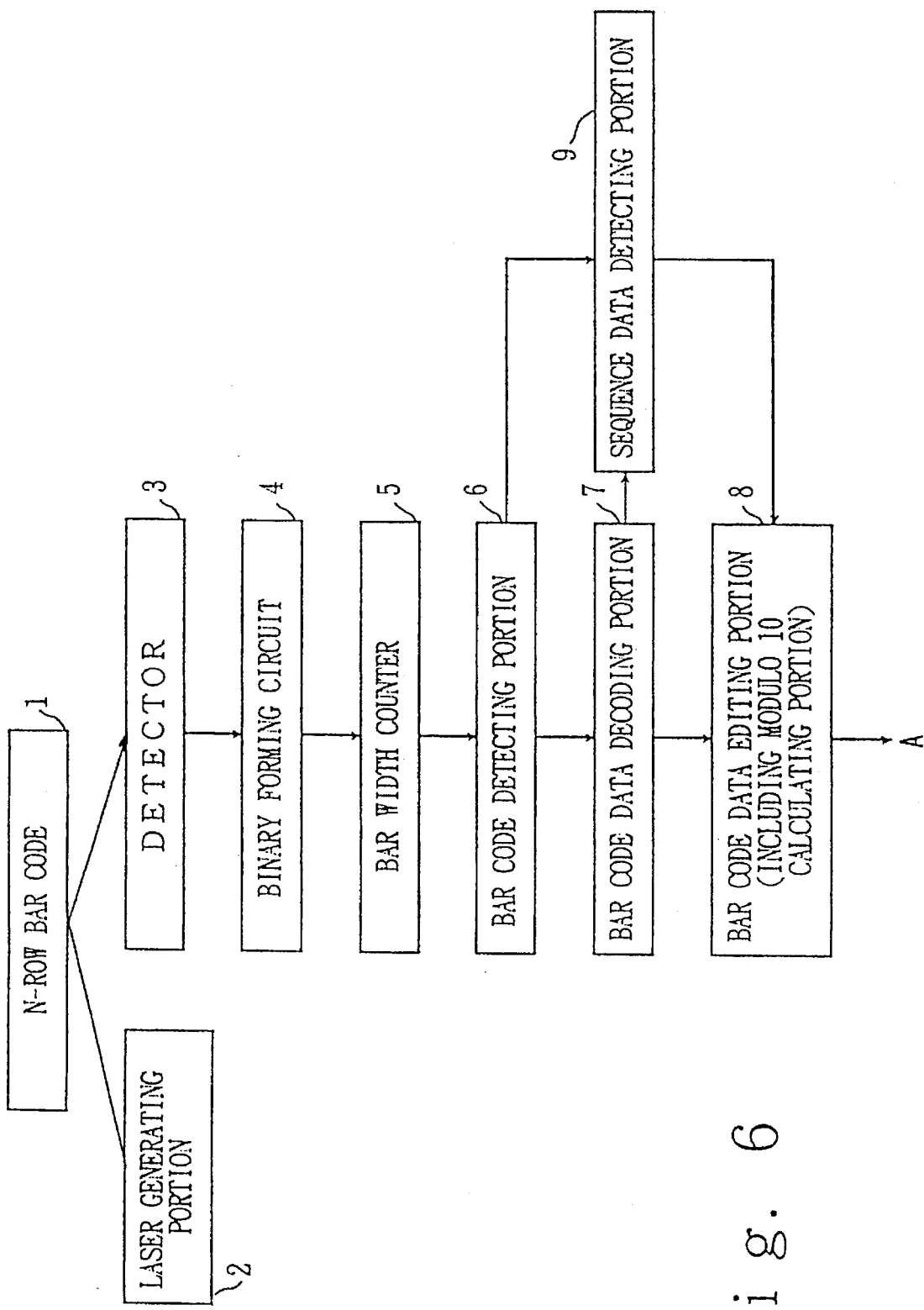
FIG. 6 is a block diagram showing a first part of the construction of a first embodiment according to the present invention.
Figure 7:
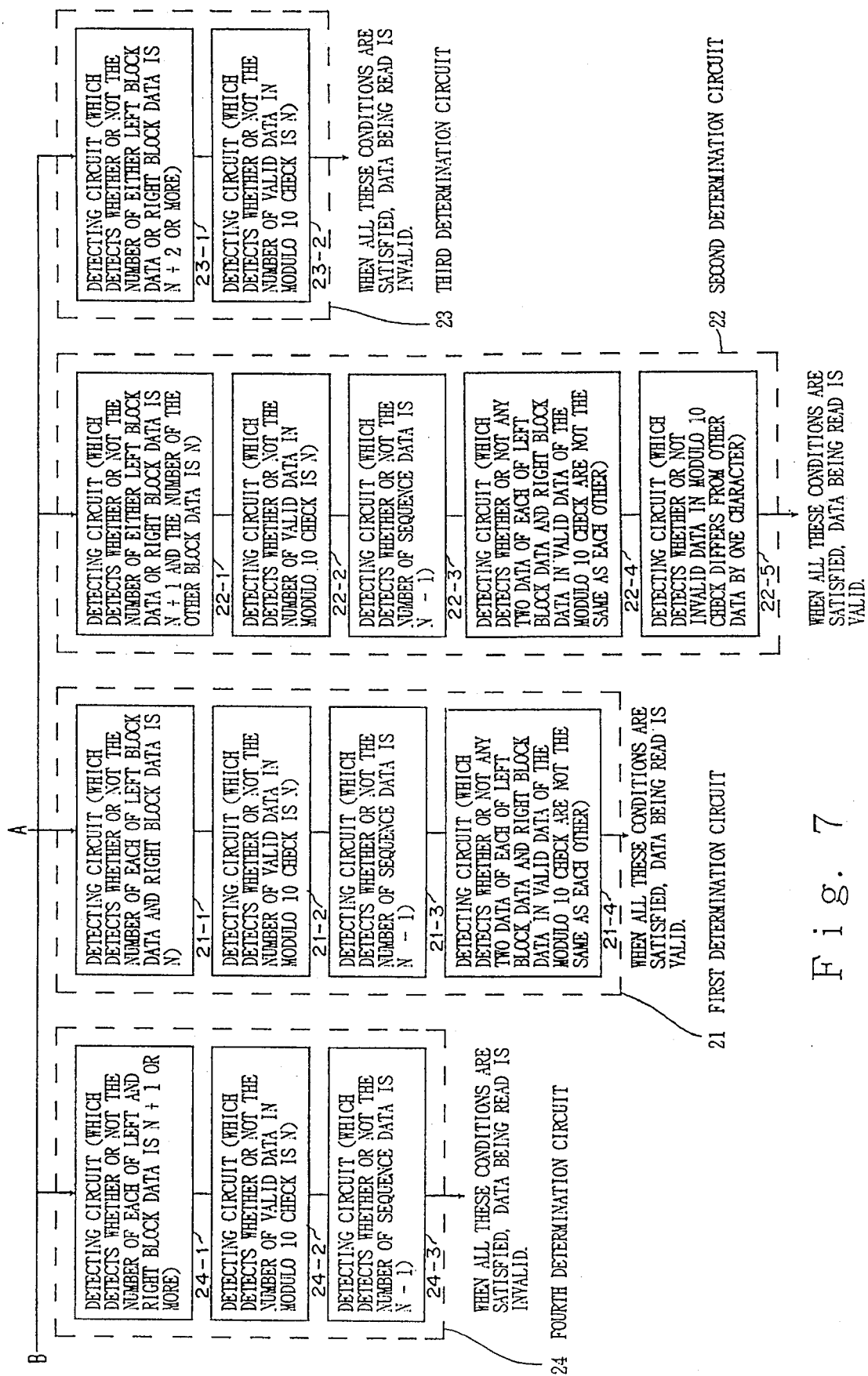
FIG. 7 is a block diagram showing a second part of the construction of the first embodiment according to the present invention.
Figure 8:
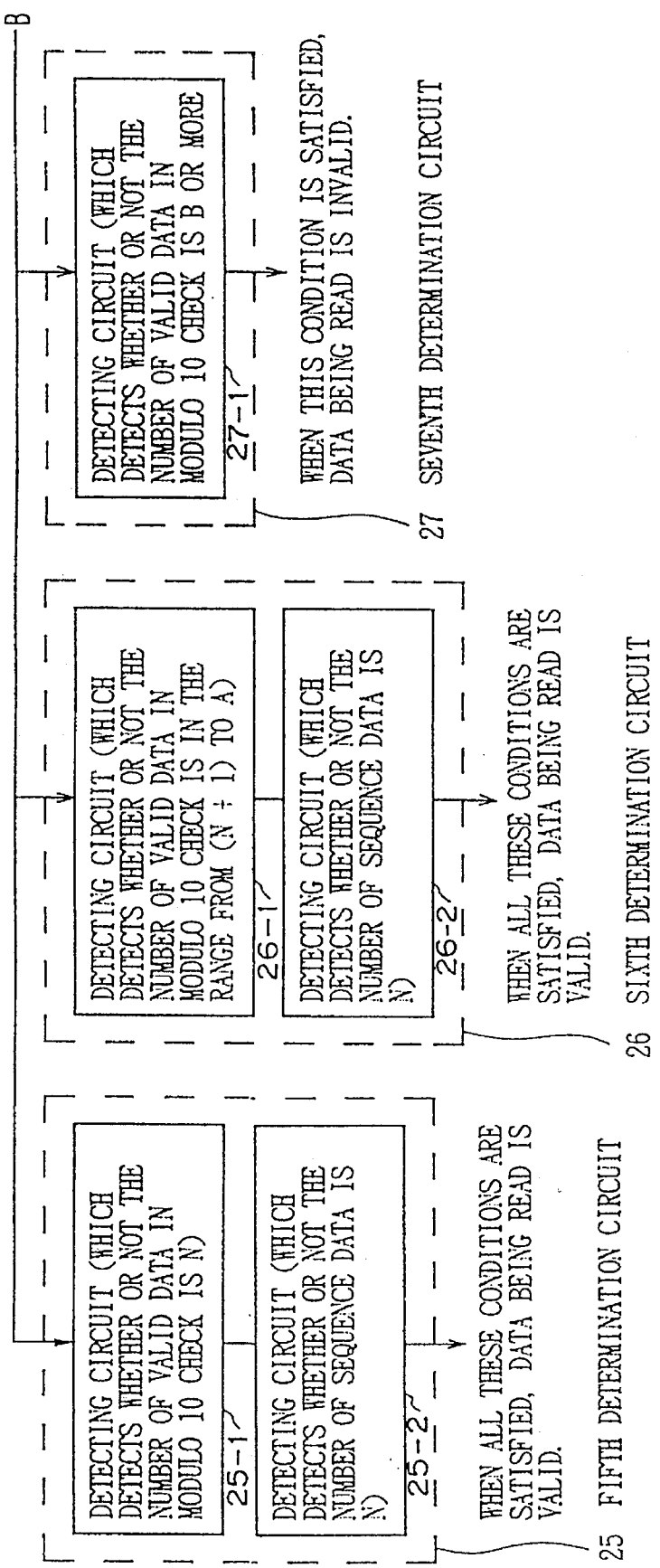
FIG. 8 is a block diagram showing a third part of the construction of the first embodiment according to the present invention.

With reference to FIGS. 6, 7, and 8, the present invention will be described in more detail.

FIGS. 6, 7, and 8 are block diagrams showing first, second, and third parts of the construction of a first embodiment according to the present invention. In these figures, A and B are connection marks. In other words, the mark A in FIG. 6 is connected to the mark A in FIG. 7, whereas the mark B in FIG. 7 is connected to the mark B in FIG. 8.

Figure 1:
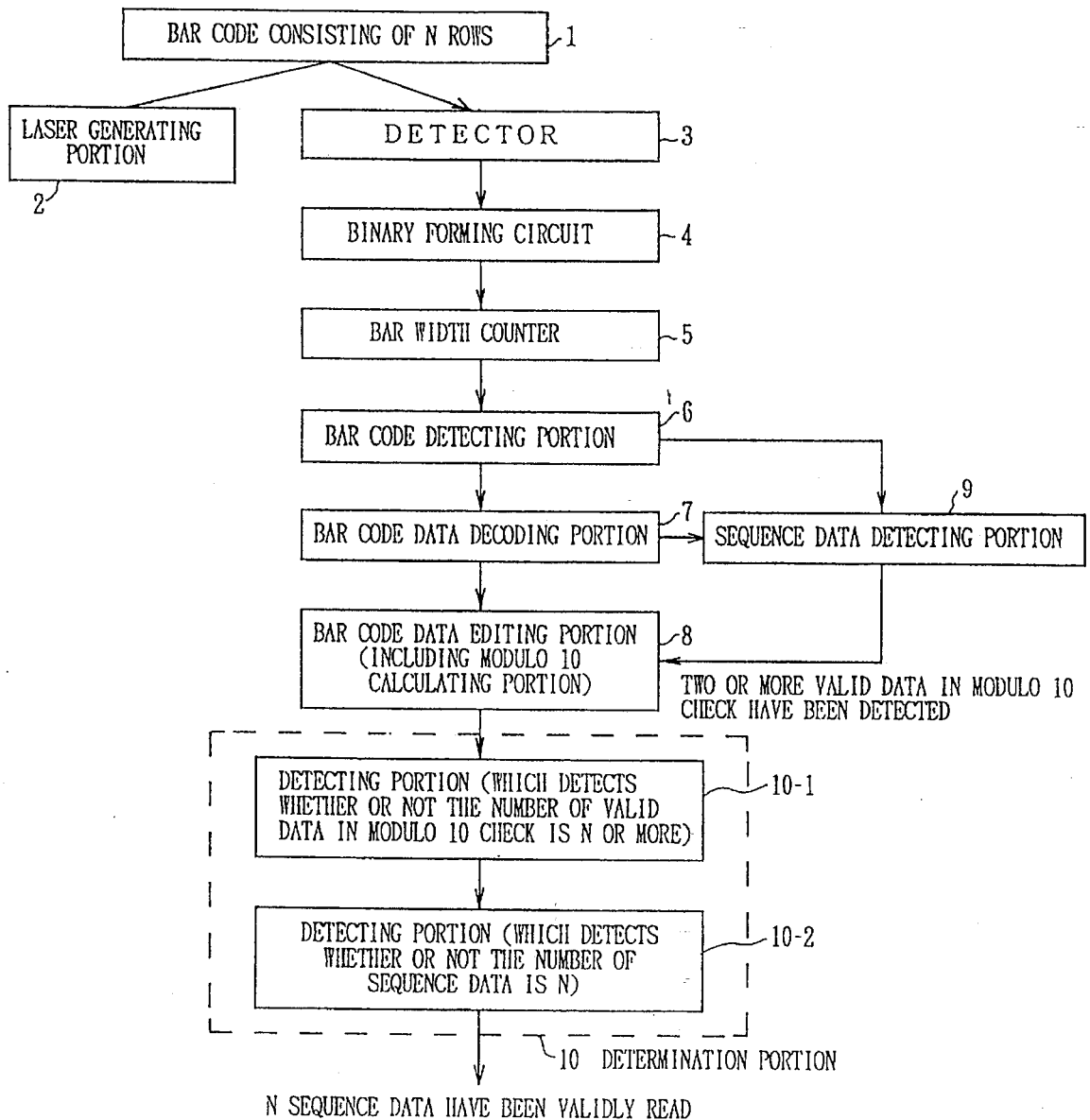
FIG. 1 is a block diagram showing the construction of a conventional reading apparatus.
Figure 2:
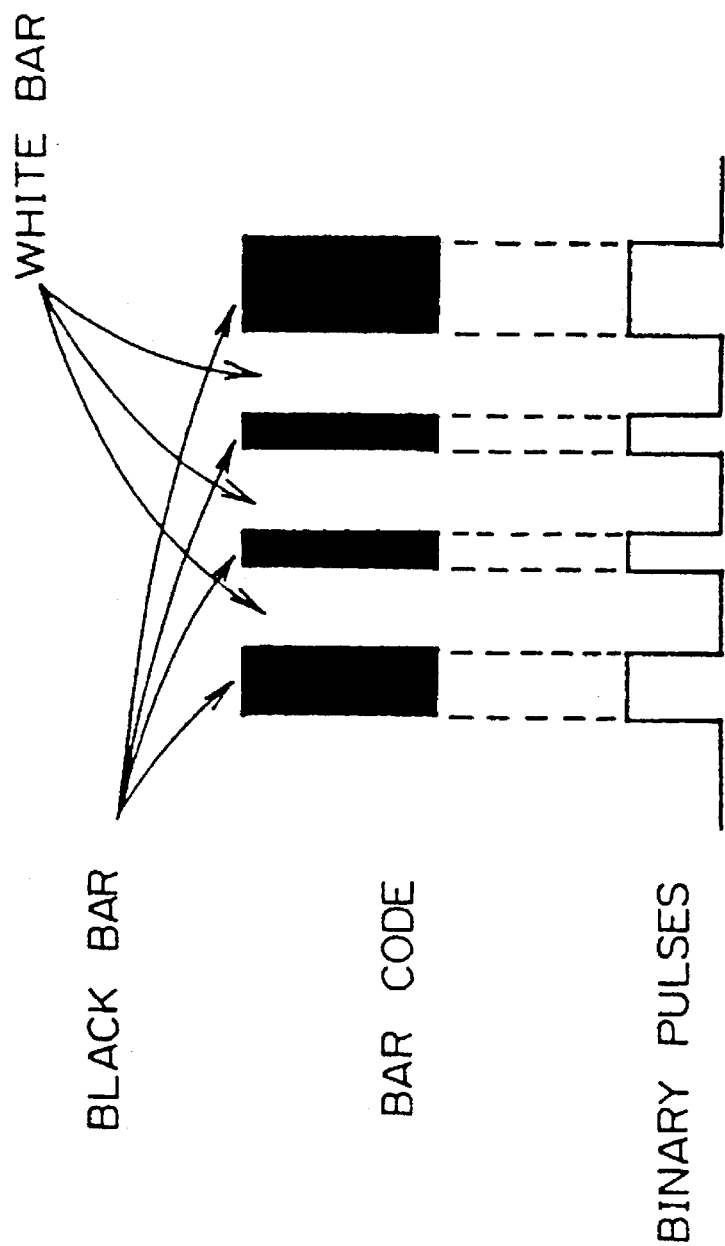
FIG. 2 is a schematic diagram for explaining binary-forming of a bar code.
Figure 3:
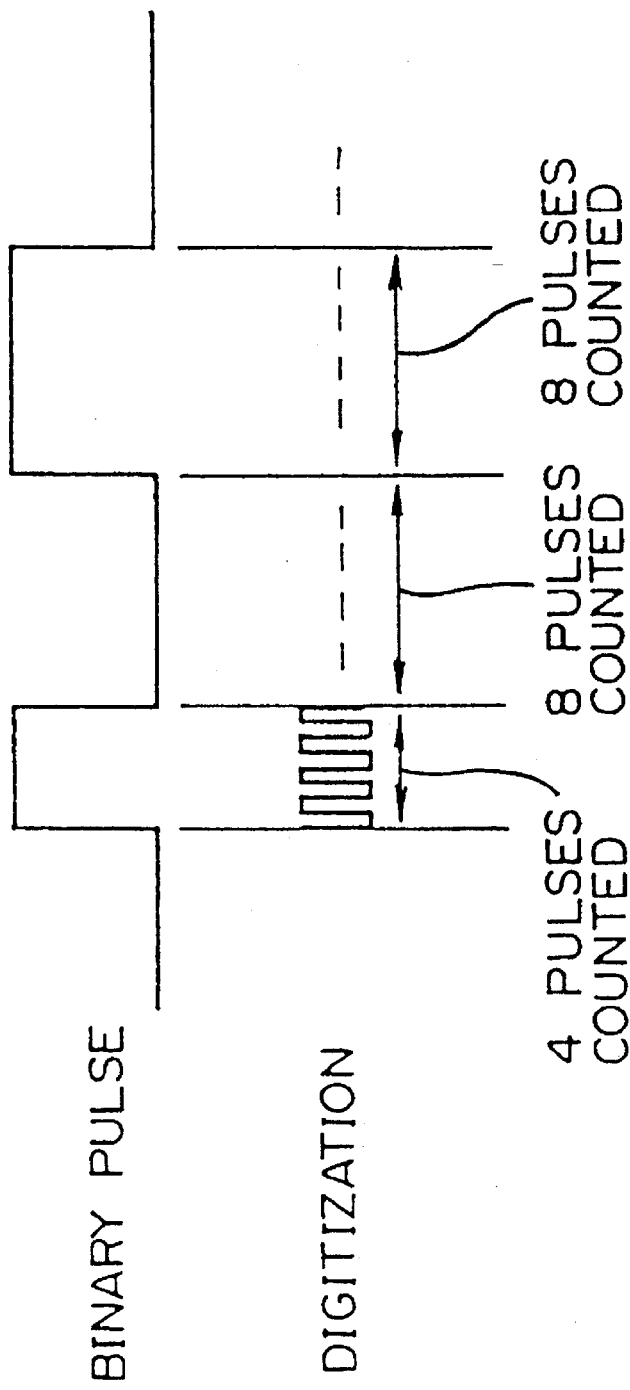
FIG. 3 is a schematic diagram for explaining digitization.
Figure 4:
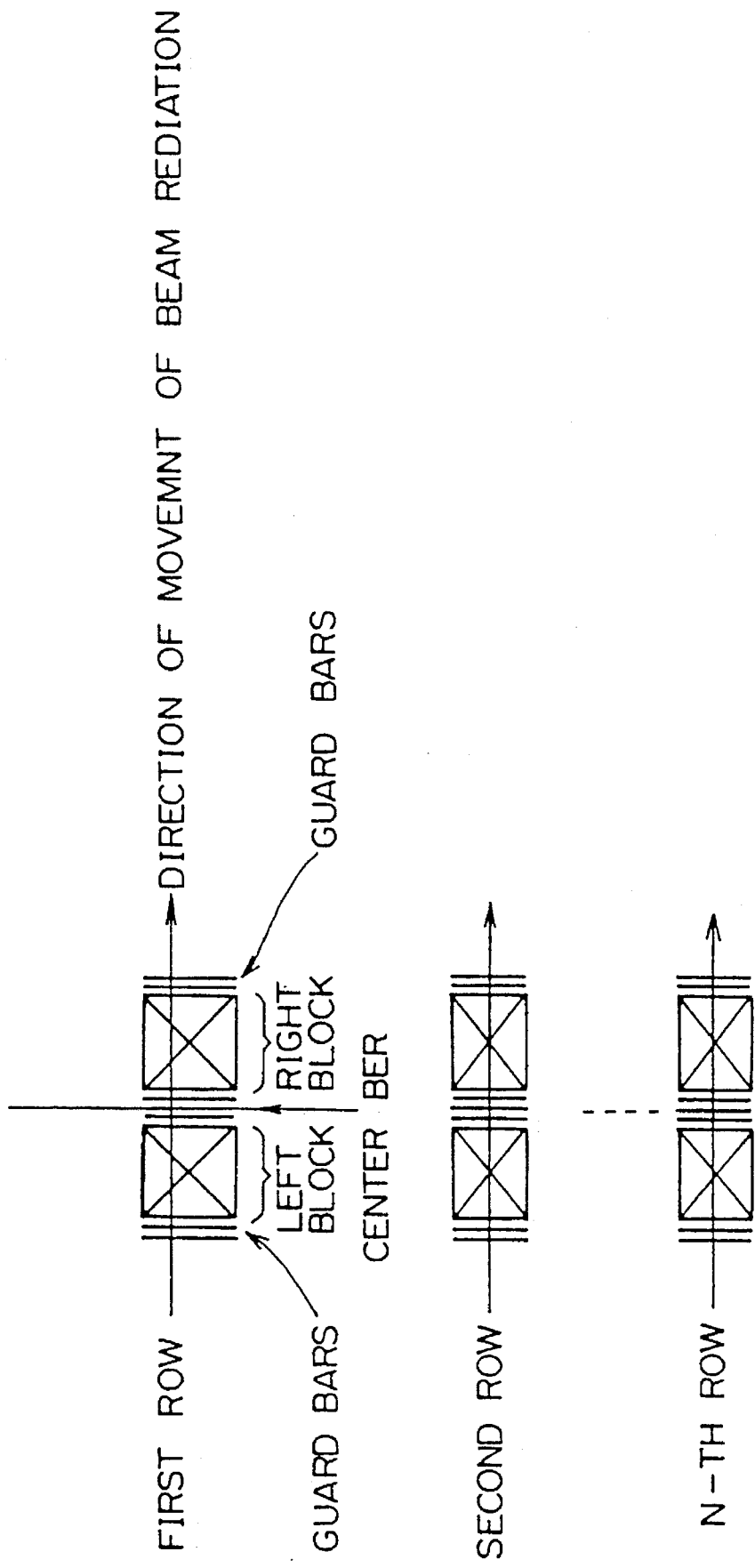
FIG. 4 is a schematic diagram for explaining a bar code.

In the embodiment according to the present invention, the construction of a laser generating portion 2, a detector 3, a binary forming circuit 4, a bar width counter 5, a bar code detecting portion 6, a bar code data decoding portion 7, a bar code data editing portion 8, and a sequence data detecting portion 9 are the same as that of the conventional apparatus shown in FIG. 1. Thus, for the sake of simplicity, the portions according to FIG. 1 are denoted by the same reference numerals thereof and their description is omitted.

Data edited by the bar code data editing portion 8 is sent to seven determination circuits 21 to 27 which are referred to as first to seventh determination circuits.

The first determination circuit 21 shown in FIG. 7, the second determination circuit 22 shown in FIG. 7, the fifth determination circuit 25 shown in FIG. 8, and sixth determination circuit 26 shown in FIG. 8 determine whether or not data being read is valid. On the other hand, the third determination circuit 23 shown in FIG. 7, the fourth determination circuit 24 shown in FIG. 7, and the seventh determination circuit 27 shown in FIG. 8 determine whether or not data being read is invalid.

The first determination circuit 21 comprises detecting circuits 21-1, 21-2, 21-3, 21-4, and 21-5. The detecting circuit 21-1 detects whether or not the number of each of left block data and right block data is n. The detecting circuit 21-2 detects whether or not number of valid data in the modulo 10 check is not the detecting circuit 21-3 detects whether or not the number of sequence data is n−1. The detecting circuit 21-4 detects whether or not any two data of each of left block data and right block data in valid data of the modulo 10 check are not the same as each other. When all these conditions are satisfied, the first determination circuit 21 treats data being read as validly read data. In other words, when all of the detecting circuits 21-1 to 21-4 have successfully detected their designated values, the first determination circuit 21 treats data being read as validly read data.

The first determination circuit 21 treats data being read as validly read data according to the following theory. Since there are N valid data in the modulo 10 check, the probability that data has been correctly read is high. In addition, any two data of each of left block data and right block data are not the same as each other, and any data has not been read twice. Thus, any two data of each of the right block data and left block data which are sequence data are not in accord with each of the right block data and the left block data which are not sequence data and in valid data of the modulo 10 check. Therefore, the right block data and left block data are valid data in the modulo 10 check. In this case, the first determination circuit 21 treats data being read as validly read data. In other words, when the number of rows of sequence data is n−1, since the remaining row of bar code can be comprised of a combination of left block data and right block data not sequence data, the beam radiation area can be widened. Thus, the apparatus can easily scan a bar code. Therefore, in the first determination circuit 21, since all n rows of a bar code are not necessarily sequence data [namely, (n−1) sequence data], when a bar code label does not contain the same blocks, the reading speed thereof is increased.

The second determination circuit 22 comprises detecting circuits 22-1, 22-2, 22-3, 22-4, and 22-5. The detecting circuit 22-1 detects whether or not the number of either left block data or right block data is n+1 and the number of the other block data is n. The detecting circuit 22-2 detects whether or not the number of valid data in the modulo 10 check is n. The detecting circuit 22-3 detects whether or not the number of sequence data is n−1. The detecting circuit 22-4 detects whether or not any two data of each of left block data and right block data in valid data of the modulo 10 check are not the same as each other. The detecting circuit 22-5 detects whether or not invalid data in the modulo 10 check differs from the other data by one character in the decoded values. When all of these conditions are satisfied, the second determination circuit 22 treat data being read as validly read data.

When one character of the block data is erroneously read, the number of block data on that side may become n+1. This situation will take place when one block is read correctly at one time and erroneously at the other time. Even if one character is erroneously read, when the number of valid data in the modulo 10 check is n, the second determination circuit 22 treats valid data in the modulo 10 check as validly read data.

The second determination circuit 22 determines whether or not the remaining one block data differs from the other block data in decoded values. As described above, when one data is erroneously read, the bar code decoding portion 7 has erroneously read one character rather than correctly reading the invalid data in the modulo 10 check. Since the second determination circuit 22 treats data being read as validly read data, the reading ratio is improved. However, when the number of sequence data is less than n−1, the other situations may take place. Thus, the determination circuit 22 also determines whether or not the number of sequence data is n−1.

The third determination circuit 23 comprises detecting circuits 23-1 and 23-2. The detecting circuit 23-1 detects whether or not the number of either left block data or right block data is n+2 or more. The detecting circuit 23-2 detects whether or not the number of valid data in the modulo 10 check is n. When all these conditions are satisfied, the third determination circuit 23 treats data being read as invalidly read data.

Even if the number of valid data in the modulo 10 check is n, when the number of data on one block side is n+2, two or more data are erroneously read on the side. Thus, since valid data in the modulo 10 check takes place by chance, the third determination circuit 23 determines that the quality of the bar code label is bad and treats data being read as invalidly read data. When two or more invalid data take place in either left block data or right block data, since the third determination circuit 23 treats data being read as invalidly read data, thereby lowering the ratio where data is erroneously read.

The fourth determination circuit 24 comprises detecting circuits 24-1, 24-2, and 24-3. The fourth detecting circuit 24-1 detects whether or not the number of each of left block data and right block data is n+1 or more. The detecting circuit 24-2 detects whether or not the number of valid data in the modulo 10 check is n. The detecting circuit 24-3 detects whether or not the number of sequence data is n−1. When all these conditions are satisfied, the fourth determination circuit 24 treats data being read as invalidly read data.

When the number of each of right block data and left block data is n+1, the left block data and the right block data each contain at least one erroneous data. Even if the number of valid data in the modulo 10 check is n and the number of sequence data is n−1, the bar code label is in erroneous reading condition (such as bad quality). Thus, the fourth determination circuit 24 treats data being read as invalid read data, thereby lowering the ratio where bar code data is erroneously read.

The fifth determination circuit 25 comprises detecting circuits 25-1 and 25-2. The detecting circuit 25-1 detects whether or not the number of valid data in the modulo 10 check is n. The detecting circuit 25-2 detects whether or not the number of sequence data is n. When all these conditions are satisfied, the fifth determination circuit 25 treats data being read as valid data.

When any two data of valid data in the modulo 10 check in either left block data or right block data are the same as each other, since the number of sequence data is n (namely, all valid data in the modulo 10 check are sequence data). Thus, the same block data can be read.

Generally, any two data of either left block data or right block data are not the same as each other. Thus, when all the above-described conditions are satisfied, the fifth determination circuit 5 treats data being read as validly read data. In addition, when any two data of each of left block data and right block data are the same as each other, all n rows of data are treated as sequence data. In a combination of n rows of different data, valid data in the modulo 10 check may take place. In this case, since the fifth determination circuit 25 treats data being read as validly read data, this bar code can be read.

The sixth determination circuit 26 comprises detecting circuits 26-1 and 26-2. The detecting circuit 26-1 detects whether or not the number of valid data in the modulo 10 check is in the range from n+1 to a predetermined value (a). The detecting circuit 26-2 detects whether or not the number of sequence data is n. When all of these conditions are satisfied, the sixth determination circuit 26 treats data being read as validly read data.

When the number of valid data in the modulo 10 check is in the range from n+1 to the value (a) (where a>n+1, however), it is supposed that valid data in the modulo 10 check have taken place due to erroneous reading or a combination of block data. Only the number of sequence data is n, the sixth determination circuit 26 treats data being read as validly read data, thereby improving the reading ratio.

The seventh determination circuit 27, having a detecting circuit 27-1, treats data being read as invalidly read data when it detects that the number of valid data in the modulo 10 check exceeds the predetermined value.

When the number of valid data in the modulo 10 check exceeds the predetermined value (which is, for example, more than the total of the numbers of left block data and right block data), the seventh determination circuit 27 determines that the bar code label is in erroneous reading condition and treats data being read as invalidly read data even if the number of sequence data is n. Thus, the erroneous reading ratio can be lowered.

The determination circuits 21–26, excluding a seventh determination circuit 27, comprise a plurality of circuits for making a judgment. By contrast, the seventh determination circuit 27 comprises a detecting circuit 27-1. Accordingly, the operation of the aforementioned seventh determination circuit 27 is performed by the detecting circuit 27-1.

The aforesaid seven determination circuits 21–27 operate independently of each other. The determination circuits 21, 22, 25 and 26 each output a signal indicating that the reading of the data is acceptable. Even in a case where the data is unreadable by a conventional method, if one of the determination circuits 21, 22, 25, and 26 outputs a reading valid signal, the reading is judged acceptable. By contrast, when even one of the determination circuits 23, 24, and 27 outputs an invalid reading signal, the reading of the data is rejected. In this situation, it is least probable that valid data has been read. However, the valid reading signal and the invalid reading signal are simultaneously output. If this case occurs, the reading of the data is judged unacceptable.

As described above, each determination circuit 21–27 concurrently judges whether or not the reading of the data is acceptable or is unacceptable, thereby shortening the time period required for the judgment.

In the apparatus according to the above described construction, a multiple-row bar code consisting of n rows is read in various conditions. The apparatus generates a valid signal or an invalid signal corresponding to these conditions so as to accurately read bar code data. Thus, the probability of erroneously reading bar code data is lowered. In particular, when a laser beam is scanned in a grid pattern, even if both left and right block data cannot be read with one scanning operation, each of left block data and right block data of each row is read in various sequences corresponding to the inclination between the grid and bar code. However, according to the embodiment of the present invention, validity or invalidity of data being read is determined corresponding to reading conditions such as the number of valid data in the modulo 10 check, the number of sequence data, the number of each of left block data and right block data, and so forth. Thus, data can be accurately read. In addition, erroneous reading can be detected. It should be noted that a laser beam may be scanned with various angles rather than in the above-described grid pattern.

When all the above-described conditions corresponding to any reading situations of a bar code scanned by a laser beam are satisfied, the apparatus according to the present invention treats bar code data as validly read data.

Figure 9:
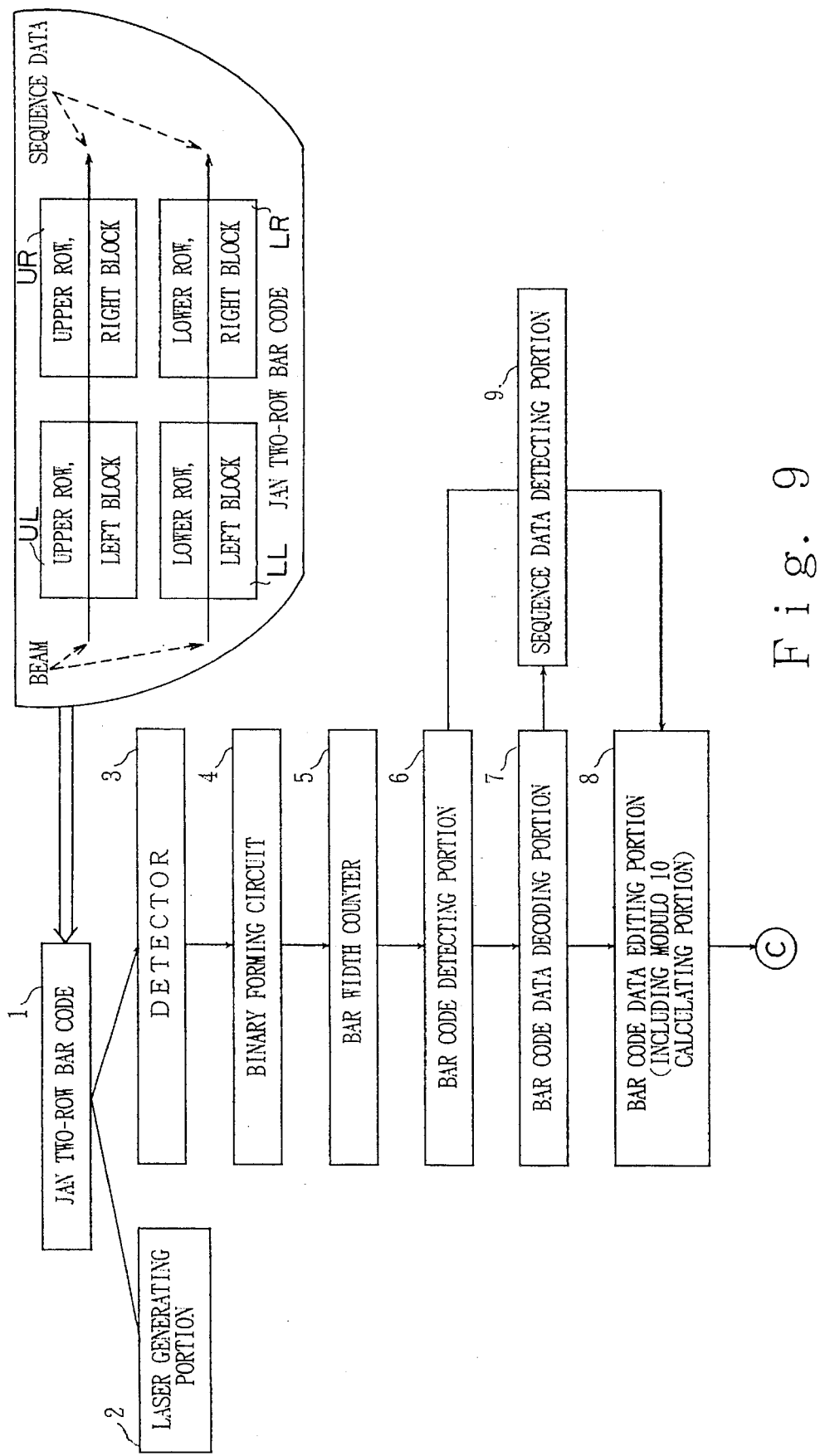
FIG. 9 is a block diagram showing a first part of the construction of a modified example of the present invention.
Figure 10:
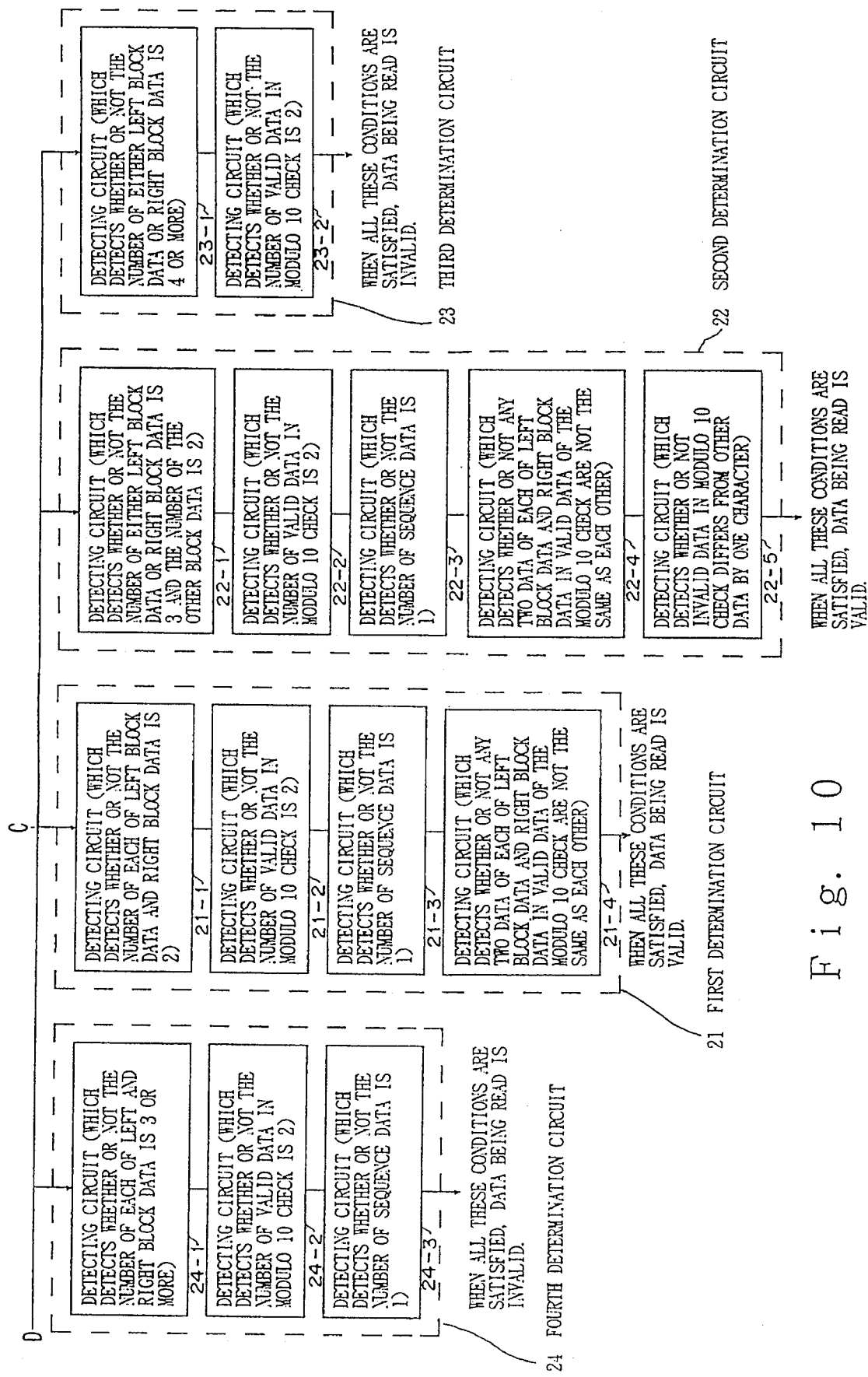
FIG. 10 is a block diagram showing a second part of the construction of the modified example of the present invention.
Figure 11:
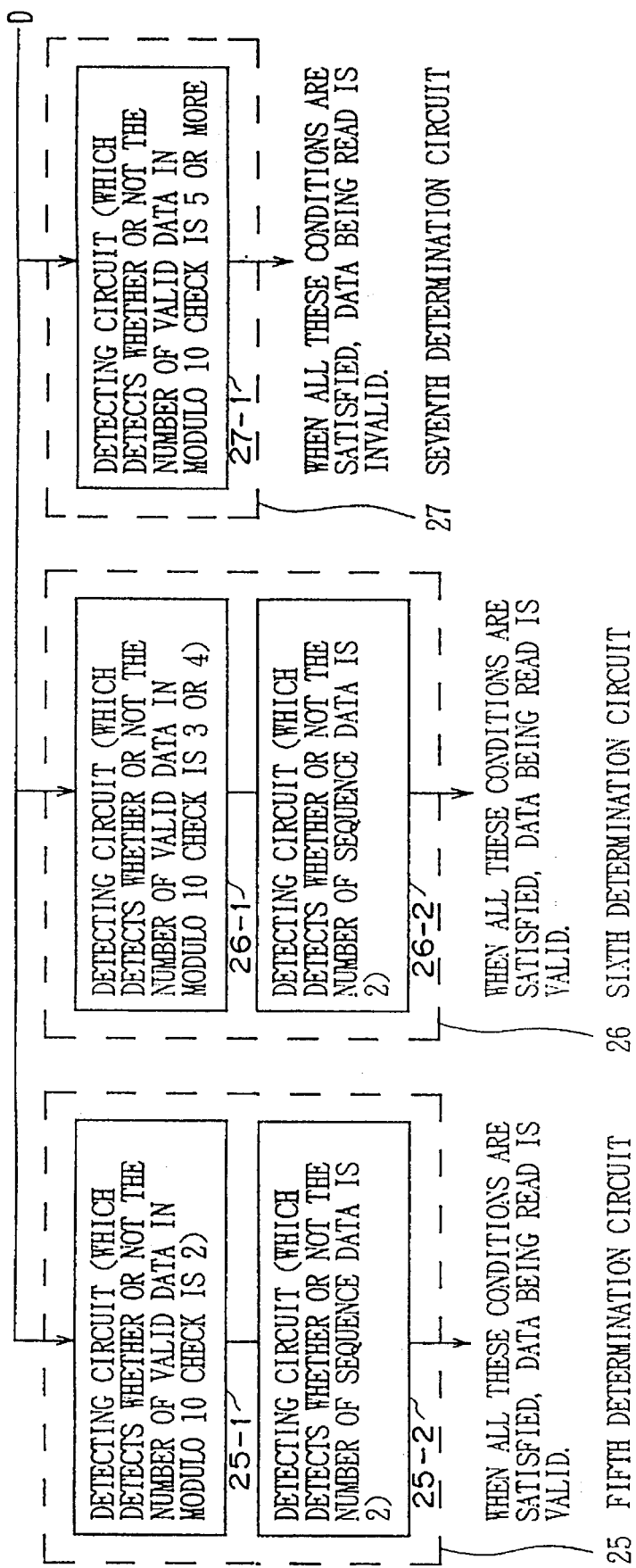
FIG. 11 is a block diagram showing a third part of the construction of the modified example of the present invention.
Figure 12:
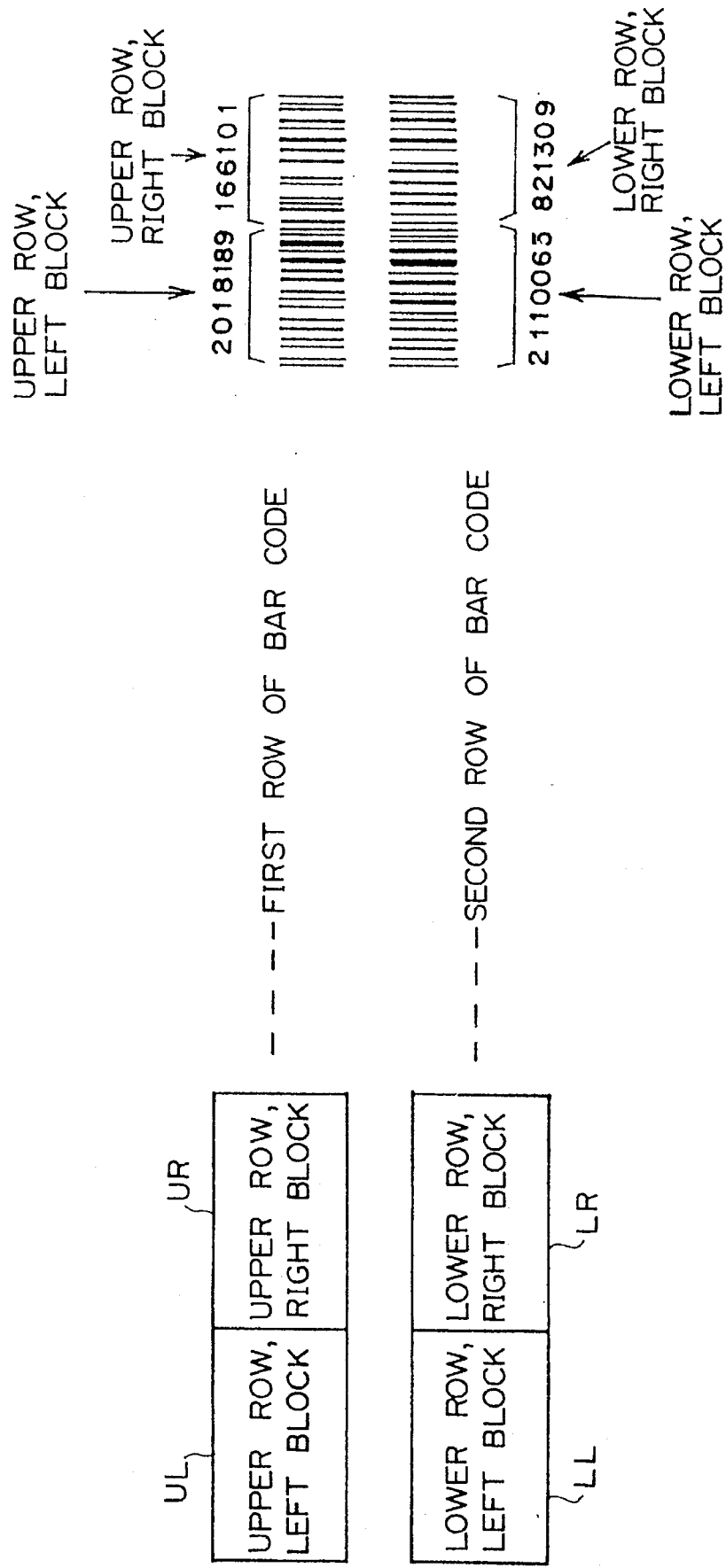
FIG. 12 is a schematic diagram for explaining a bar code consisting of two rows.

FIGS. 9, 10, and 11 are block diagrams showing first, second, and third parts of the construction of a modified example of the present invention. In these figures, C and D are connection marks. The mark C in FIG. 9 is connected to the mark C in FIG. 10, whereas the mark D in FIG. 10 is connected to the mark D in FIG. 11. The construction shown in FIGS. 9, 10 and 11 is more practical than the construction shown in FIGS. 6, 7, and 8, where a bar code consisting of two rows according to JAN system is read. As shown in FIG. 9, a JAN two-row bar code is constructed of an upper left block, an upper right block, a lower left block, and a lower right block. FIG. 12 is a schematic diagram for explaining a two-row bar code. In the modified example shown in FIGS. 9, 10, and 11, this two-row bar code is read. In the JAN two row bar code, the upper row and the lower row are identified in the following manner.

Several most significant digits of each of the upper and lower rows of bar code data are predesignated. These digits are referred to as flag codes. With these flag codes, data of upper and lower rows are identified. For example, the flag codes of upper and lower rows are predesignated as 20 and 21, respectively. Thus, "2018189166101" and "211003821309" are identified as the upper row and lower row of a bar code, respectively. In this case, in the first embodiment shown in FIGS. 6, 7, and 8, n is 2. Likewise, in the modified example shown in FIGS. 9, 10, and 11, "a" and "b" are 4 and 5, respectively. Thus, even if bar code data cannot be read as sequence data (namely, it is read by a plurality of scanning operations), the editing portion edits bar code data being read as sequence data. Thus, even if the number of left block data does not match the number of right block data, the apparatus can treat the bar code data being read as validly read data.

Furthermore, below is an explanation of whether read data are valid or invalid by referring to the two-row bar code shown in FIG. 12, as a practical example. For example, the two-row bar code shown in FIG. 12 is a JAN long code with the left side bar code in the upper row referred to as UL, the right side bar code in the upper row as UR, the left side bar code in the lower row as LL, and the right side bar code in the lower row as LR. Thus, the above described items (1)–(7) are sequentially explained as follows.

In item (1), read data are valid when there are two pieces of data UL and LL, and UR and LR respectively in each of the left and right blocks; valid in the modulo 10 check are UL+UR and LL+LR (where the plus sign + indicates that the data of the left term and the right term are synthesized); and the data in the left block or the data in the right block do not match in the synthesized data UL+UR and LL+LR, that is, UL≠LL and UR≠LR.

In the normal reading operation, since there are two pieces of valid data in the modulus 10 check, UL+LR UR+LL can be erroneously read as upper or lower data. To prevent the misreading, at least one-row data, for example, UL+UR must be sequence data. That is, data in at least one row should be sequential. Furthermore, UL≠LL and UR≠LR are determined based on a block position, for example, UL+UR, UL+LR, etc. (a piece of block data UL is erroneously used in two rows). Data are valid if all requirements.

In item (2), data are valid when there are two pieces valid data in the modulo 10 check UL+UR and LL+LR, and a piece of sequence data UL+UR; left block data are UL, LL, and LL' (where LL' is misread for LL) right lock data are UR and LR; and LL' not treated as data of modulus 10 is different in one character from the other left block data UL and LL. There must be two pieces of valid data in the modulo 10 check and one piece of sequence data on the same ground as the requirements of the above described item (1). That is, in a normal reading operation, since there are two pieces of valid data in the modulo 10 check, and UL+LR and UR+LL can be erroneously read as the upper or lower row data, at least one-row data, for example UL+UR, are sequence data. Furthermore, if a piece of misread data such as LL', etc. appears, invalid data which are different by only one character from the correct data are considered valid by determining that the data are misread from the left data.

In item (3), data are valid when there are two pieces of valid data in the modulo 10 check UL+UR and LL+LR, and two pieces of sequence data UL+UR and LL+LR. Since there are two pieces of valid data in the modulo 10 check and they are also sequential, they are determined to contain no errors, and accepted as an simply an accidental error even if UR=LR.

In item (4), data are valid when there are four pieces of valid data in the modulo 10 UL+UR, LL+LR, UL+UR', and LL'+LR, and two pieces of sequence data UL+UR and LL+LR. Although the four pieces of valid data in the modulo 10 check contain two pieces of misread data, the two pieces of sequence data UL+UR and LL+LR are determined to be valid.

In item (5), data are invalid when there are two pieces of valid data in the modulo 10 check UL+UR, and LL+LR, and four or more left block or right block data, for example, UL, UL', LL, LL'. Since there are two valid data in the modulo 10 check, the data are valid in the case of, for example, item (1). However, if four blocks are detected as left blocks, then the data are invalid as too numerous misreadings regardless of the number of sequence data.

In item (6), data are valid when there are two pieces of valid data in the modulo 10 check UL+UR and LL+LR, one piece of sequence data UL+UR, and three or more pieces of data UL, LL, UL', UR, LR, and LR' in both right and left blocks. If there are two pieces of valid data in the modulo 10 check, one sequence data, then two pieces of data are required in both left and right blocks as described in the explanation of term (1). However, since there are three pieces of data UL, LL, UL' and UR, LR, LR' respectively in each of the left and right blocks, a piece of data is read from each of the left and right blocks. As a result, the data are invalid as too numerous misreadings.

In item (7), data are invalid when there are five pieces of valid data in the modulo 10. Five pieces of valid data in the modulo 10 check cause the read data to be invalid as too numerous misreadings.

Figure 13:
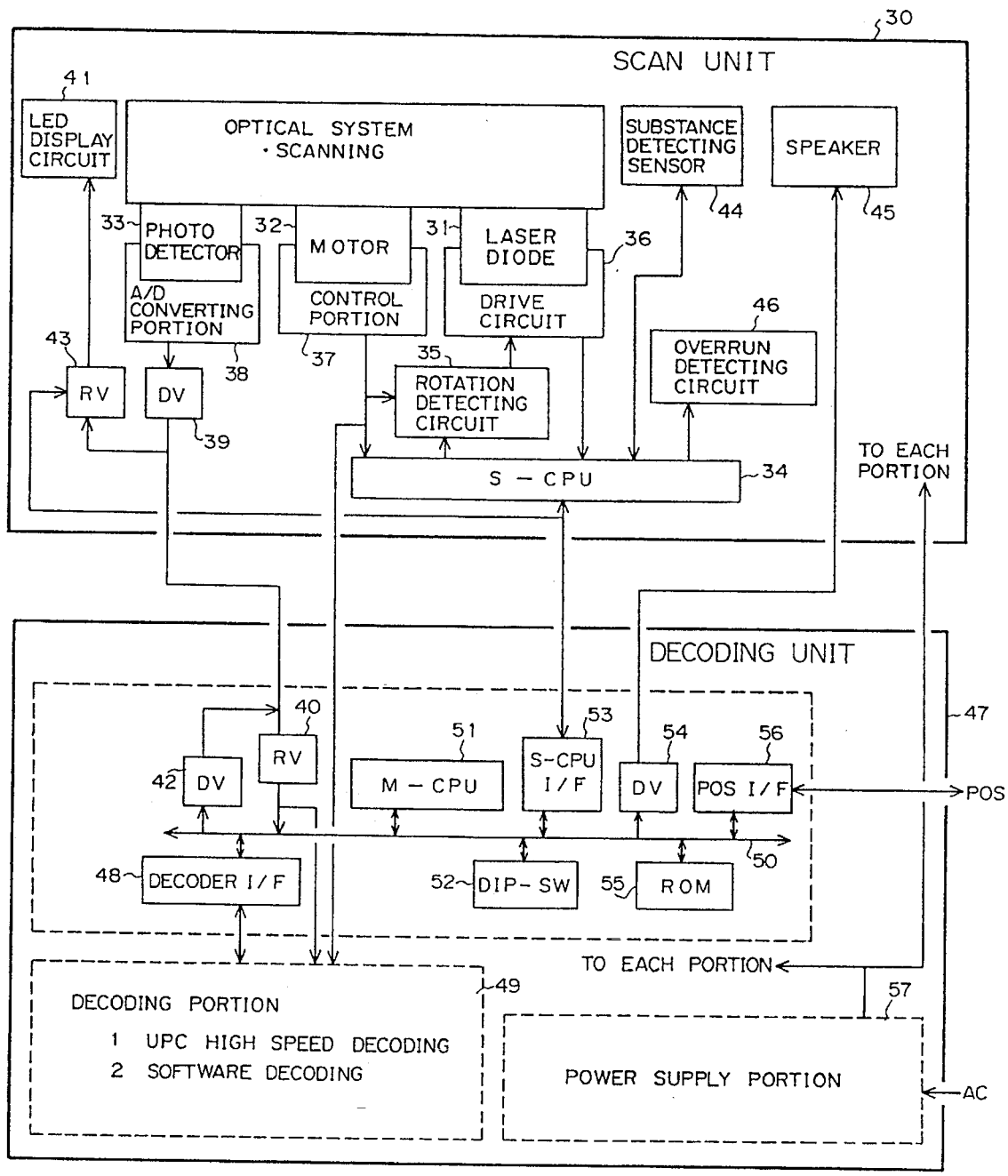
FIG. 13 is a block diagram showing the construction of a second embodiment according to the present invention.

FIG. 13 is a block diagram showing the construction of an embodiment according to the present invention. In the above-described first embodiment, validity and invalidity of bar code data being read are determined by circuits. Unlike with the first embodiment, in this embodiment, validity and invalidity of bar code data are determined by a program.

In FIG. 13, reference numeral 30 is a scan unit. In the scan unit 30, a scan unit CPU (S-CPU) 34 is provided. The scan unit CPU causes a drive circuit 36 to drive a laser diode 31 through a rotation detecting circuit 35. The rotation detecting circuit 35 turns off the laser generation when the rotation of a motor 32 decreases to a predetermined speed.

When the motor 32 rotates at the predetermined speed, the rotation detecting circuit 35 sends a drive signal to the drive circuit 36. Thus, the drive circuit 36 drives the laser diode 31. To radiate the laser beam generated by the laser diode 31 in a predetermined direction, the motor 32 is operated under the control of a control portion 37. The rotation detecting circuit 35 detects the rotation of the motor 32.

The motor 32 causes for example a mirror to rotate so as to scan the laser beam generated by the laser 31.

Laser light reflected by a bar code, merchandise item, or the like is exposed to a photo detector 33. The output signal of the photo detector 33 is sent to an A/D converting portion 38. The A/D converting portion 38 converts the input signal into digital data. The digital data is sent to a decoding unit 47 through a driver (DV) 39 and a receiver (RV) 40.

The scan unit 30 also contains an LED display circuit 41. The LED display circuit 41 displays a message received from the decoding unit 47 through the driver 42 and the receiver 43. The scan unit 30 is also provided with a substance detecting sensor 44, a speaker 45, and an overrun detecting circuit 46. The substance detecting sensor 44 detects whether or not a substance is being placed in a predetermined area. When the substance detecting sensor 44 has detected a substance, it informs the scan unit CPU 34 of the presence of the substance. Thus, the scan unit CPU 34 drives the laser diode 31 so as to start the scanning. The speaker 45 generates beep sounds when a reading error takes place or whenever a substance is read so as to inform the user of these occurrences. The overrun detecting circuit 46 is a watchdog timer which resets the scan unit CPU 34 in the scan unit 30 when it overruns.

The digital signal which was A/D converted is sent to the decoding unit 47 through the driver 39 and the receiver 40. In the decoding unit 47, the input signal is sent to a decoding portion 49 through a decoder interface 48.

The decoding unit 47 is provided with a bus 50. The 50 is connected to an M-CPU 51, an S-CPU I/F 53, DIP-SW 52, a ROM 55, a driver 54, and a POS I/F 56 which construct a processor system. The M-CPU 51 in the decoding unit 47 controls each portion connected through the bus 50. In addition, the decoding unit 47 is provided with a power supply portion 57. The power supply portion 57 supplies electricity to each circuit in the scan unit 30 and the decoding unit 47.

The POS I/F 56 in the decoding unit 47 is connected to a POS terminal so as to output bar code data thereto. The M-CPU 51 causes the speaker 45 to sound and the LED (display circuit 41) to display a message. In addition, the M-CPU 51 controls the decoding of bar code data.

As described above, the photo detector 33 detects the reflected light of a laser beam and sends the detected signal to the A/D converting portion 38. The A/D converting portion 38 converts the input signal into digital data. The digital data is sent to the decoding unit 47. The decoding unit 47 obtains the pulse width of the digital data. The above-described A/D converting portion 38 converts analog data to multi-value data. However, it should be noted that the input analog data may be changed into binary data by a predetermined threshold value. In this case, the binary process in the decoding unit 47 is not required.

Thereafter, the region of the bar code is detected and decoded as bar code data. In addition, sequence data of the bar code data is detected. Thus, the bar code data is edited. At this point, the modulo 10 check is performed for the bar code data. These processes are the same as those performed in the conventional apparatuses. Thereafter, a reading determination process is performed. The decoding unit 47 is also provided with the decoding portion 49. The decoding portion 49 decodes the bar code data into numeric value with UPC high speed decoding and software decoding. Next, the software decoding process will be described.

Figure 14:
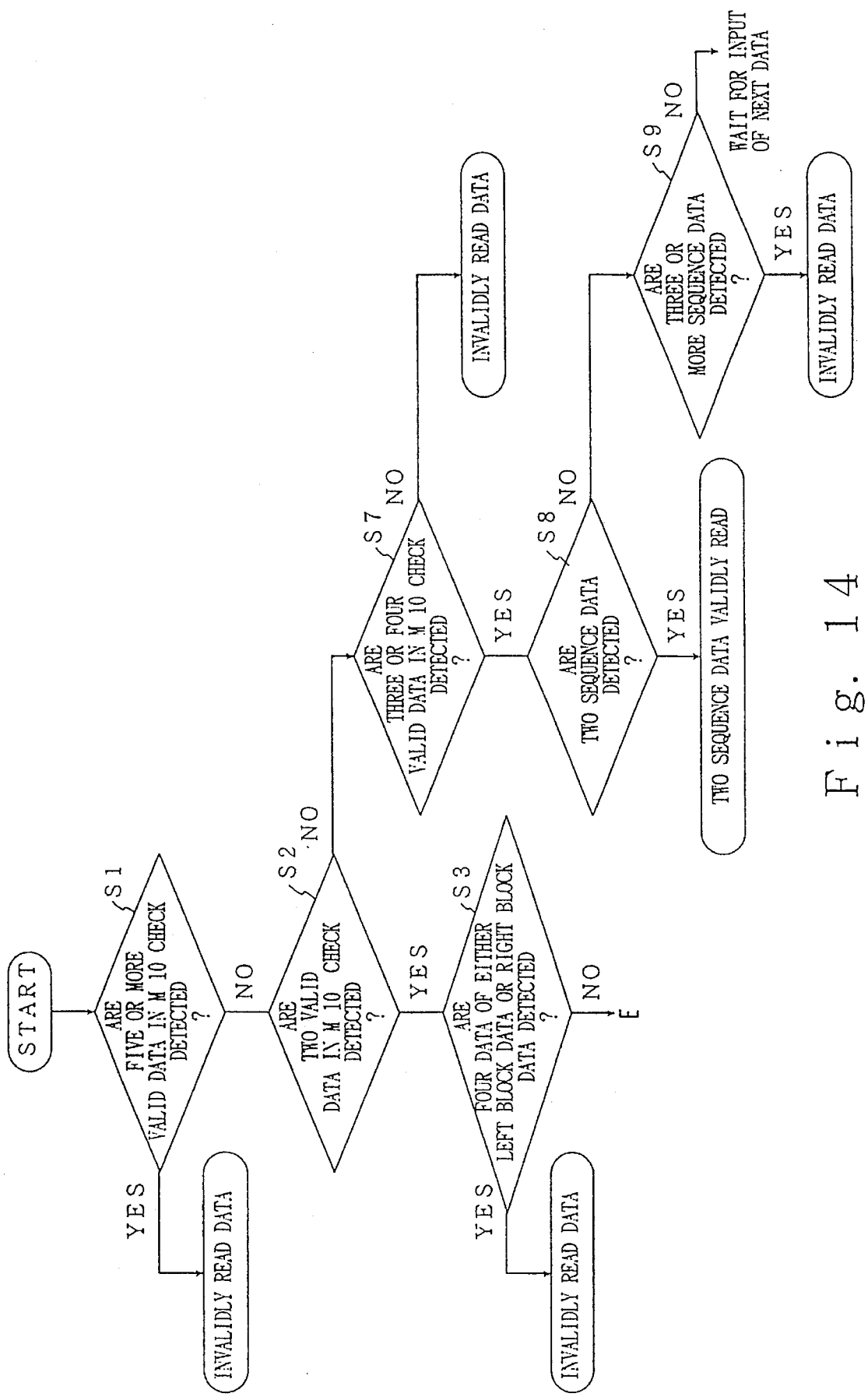
FIG. 14 is a flow chart showing a first part of reading determination process.
Figure 15:
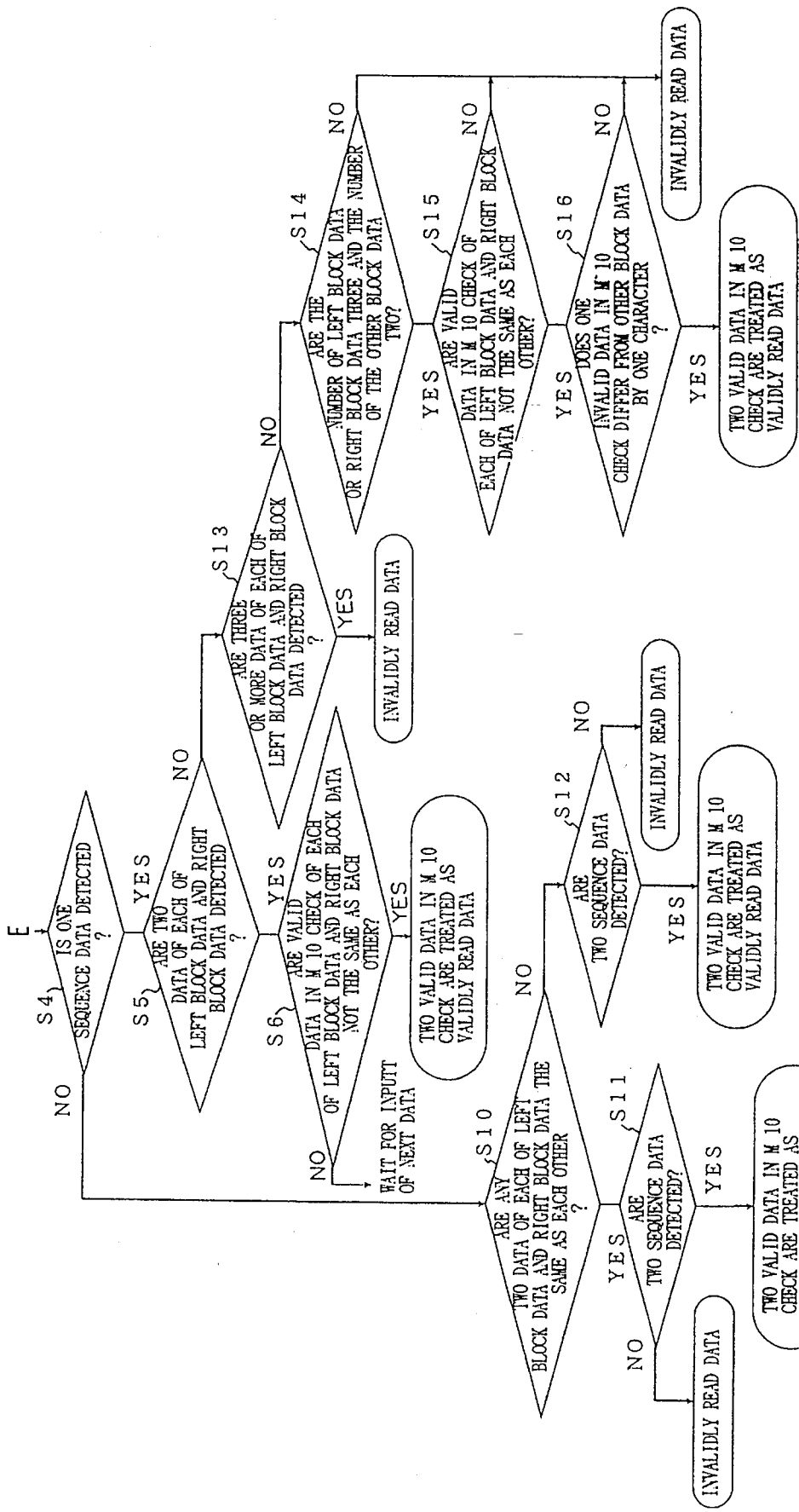
FIG. 15 is a flow chart showing a second part of the reading determination process.

FIGS. 14 and 15 are flow charts showing a reading determination process. In the above-described first embodiment, each determination circuit is independently provided with similar circuits when necessary. However, in the process shown in FIGS. 14 and 15, the similar circuits are shared by the process. Thus, validity or invalidity of bar code data is determined by the shared circuits. The reading determination in FIGS. 14 and 15 accords with the determination in the modified example shown in FIGS. 9, 10, and 11. In FIGS. 14 and 15, E is a connection mark. In other words, the mark E shown in FIG. 14 is connected to the mark E shown in FIG. 15.

When the reading determination process is started, the decoding portion 49 determines whether or not it has detected five or more valid data in the modulo 10 check (at step S1). When five or more valid data in the modulo 10 check have been detected (namely, the determined result is YES), the decoding portion 49 treats data being read as invalidly read data. When less than five valid data in the modulo 10 check have been detected, the decoding portion 49 determines whether or not two valid data in the modulo 10 check have been detected (at step S2). When two valid data have been detected in the modulo 10 check (namely, the determined result is YES), the decoding portion 49 determines whether or not four block data of either left block data or right block data have been detected (at step S3). When four block data have been detected (namely, the determined result is YES), the decoding portion 49 treats data being read as invalidly read data. When four block data have not been detected (namely, the determined result is NO), the decoding portion 49 determines whether or not one sequence data has been detected (at step S4). When one sequence data has been detected (namely, the determined result is YES), the decoding portion 49 determines whether or not two block data of each of left block data and right block data have been detected (at step S5). When two block data of each of left block data and right block data have been detected (namely, the determined result is YES), the decoding portion 49 determines whether or not any two data of each of the left block data and right block data in valid data of the modulo 10 check are not the same as each other (at step S6). When any two data are not the same (namely, the determined result is NO), the decoding portion 49 treats two valid data in the modulo 10 check as validly read data. When any two data are the same (namely, the determined result is NO), the decoding portion 49 waits for a next input of data.

When two valid data in the modulo 10 check have not been detected (namely, the determined result is NO), the decoding portion 49 determines whether or not three or four valid data in the modulo 10 check have been detected (at step S7). When three or four valid data in the modulo 10 check have not been detected (namely, the determined result is NO), the decoding portion 49 treats data being read as invalidly read data. When three or four valid data in the modulo 10 check have been detected (namely, the determined result is YES), the decoding portion 49 determines whether or not two sequence data have been detected (at step S8). When two sequence data have been detected (namely, the determined result is YES), the decoding portion 49 treats two sequence data as validly read data. When two sequence data have not been detected (namely, the determined result is NO), the decoding portion 49 determines whether or not three or more sequence data have been detected (at step S9). When three or more sequence data have been detected (namely, the determined result is YES), the decoding portion 49 treats data being read as invalidly read data. Otherwise, (namely, when the determined result is NO), the decoding portion 49 waits for a next input of the data.

When one sequence data has not been detected at the step S4 (namely, the determined result is NO), the decoding portion 49 determines whether or not any two data of either left block data or right block data in valid data of the modulo 10 check are the same as each (at step S10). When any two data are the same as each other, the decoding portion 49 determines whether or not two sequence data have been detected (at step S11). When two sequence data have been detected (namely, the determined result is YES), the decoding portion 49 treats two valid data in the modulo 10 check as validly read data. When two sequence data have not been detected (namely, the determined result is NO), the decoding portion 49 treats data being read as invalidly read data.

When any two data are not the same at the step S10, the decoding portion 49 determines whether or not two sequence data have been detected (at step S12). When two sequence data have been detected, the decoding portion 49 treats two valid data in the modulo 10 check as validly read data. When two sequence data have not been detected, the decoding portion 49 treats data being read as invalidly read data.

When two block data of each of left block data and right block data have not been detected at the step S5 (namely, the determined result is NO), the decoding portion 49 determines whether or not three or more block data of each of left block data and right block data have been detected (at step S13). When three or more block data have been detected (namely, the determined result is YES), the decoding portion 49 treats data being read as invalidly read data. When three or more block data of each of left block data and right block data have not been detected (namely, the determined result is NO), the decoding portion 49 determines whether or not the number of left block data or right block data is three and the number of the other block data is two (at step S14). When the number of left block data or right block data is three and the number of the other block data is two (namely, the determined result is YES), the decoding portion 49 determines whether or not any two data of each left block data and right block data in valid data of the modulo 10 check are not the same as each other (at step S15). When any two block data in valid data of the modulo 10 check are not the same as each other (namely, the determined result is NO), the decoding portion 49 determines whether or not invalid data in the modulo 10 check differs from the other block data by one character (at step S16). When invalid data in the modulo 10 check differs from the other block data by character, the decoding portion 49 treats two valid data in the modulo 10 check as validly read data. When the determined results of these steps S14, S15 and S16 are NO, YES, and NO respectively, the decoding portion 49 treats data being read as invalidly read data.

With the above-described process, the decoding portion 49 decodes a signal of a bar code consisting of n rows and sends the decoded signal to the microprocessor M-CPU 51 through the decoder interface 48.

On the other hand, the ROM 55 stores a program that the M-CPU 51 executes. The program stored in the ROM 55 controls each circuit corresponding to switch positions of the dip switch 52. In other words, the M-CPU 51 controls the type of bar code for the scan unit, speaker ON/OFF, validity or invalidity of data output the POS terminal, and so forth.

When this program is executed, the M-CPU 51 reads the status of the dip switch and controls each circuit. The M-CPU 51 sends the type of bar code to the scan unit CPU 34 through the scan CPU I/F 53 and causes the scan unit CPU 34 to start the reading operation of the scan unit 30. With this operation, the scan unit 30 reads a bar code and sends the bar code data to the decoding portion 49. The decoding portion 49 decodes the received signal and sends the decoded signal to the M-CPU 51. When the dip switch 52 has been set to the POS terminal output mode, the M-CPU 51 sends the decoded value to the POS terminal through the POS I/F 56. When the dip switch 52 has been set to the display mode, the M-CPU 51 sends the decoded value to the LED display circuit 41 through the receiver 43. Thus, the LED display circuit 41 displays the decoded result. When the decoded result is invalid, the M-CPU 53 sends a sound output to the driver 54. Thus, the driver 54 causes the speaker 45 to generate an error sound.

By the operations of the scan unit 30 and the decoding unit 47, a multiple-row bar code is read. The result is sent to the LED display circuit 41 or the POS terminal.

In the above description, only the JAN standard system was described. However, the present invention can be applied to bar codes corresponding to other standard systems as well as EAN and UPC standard systems.

As described above, according to the present invention, since the result of bar code data determined by the modulo 10 check is changed according to the number of sequence data and the number of each of left block data and right block data, validity or invalidity of the bar code data can be securely determined. Thus, the reading ratio can be improved and the erroneous reading ratio can be lowered.

In addition, according to the present invention, the following results can be obtained.

The apparatus according to the present invention determines whether or not the number of each of left block data and right block data is n, whether or not the number of valid data in the modulo 10 check is n, whether or not the number of sequence data is n−1, and whether or not any two data of each of left block data and right block data in valid data of the modulo 10 check are not the same as each other and outputs a reading valid signal when all these conditions are satisfied. Thus, all n rows are not necessarily sequence data (namely, the number of sequence data can be n−1). As a result, in the case of a bar code label without the same block data, the reading speed is improved.

The apparatus according to the present invention determines whether or not the number of valid data in the modulo 10 check is n, whether or not the number of sequence data is n−1, whether or not the number of left block data or right block data is n+1 and the number of the other block data is n, and whether or not invalid data in the modulo 10 check differs from the other block data by one character in decoded values and outputs a reading valid signal when all these conditions are satisfied. As a result, when one block data is erroneously read, the reading speed is improved.

The apparatus according to the present invention determines whether or not the number of valid data in the modulo 10 check is n and whether or not the number of left block data or right block data is n+2 or more and outputs a reading invalid signal when all these positions are satisfied. Thus, when two or more data of left block data or right block data are erroneously read, data being read is treated as invalidly read data. As a result, the erroneously read ratio is lowered.

The apparatus according to the present invention determines whether or not the number of valid data in the modulo 10 check is n, whether or not the number of sequence data is n−1, and whether or not the number of each of left block data and right block data is n+1 and outputs a reading invalid signal when all these conditions are satisfied. Thus, when two or more data of each of left block data and right block data are erroneously read, data being read is treated as invalidly read data. Thus, the erroneously reading ratio is lowered.

The apparatus according to the present invention determines whether or not the number of valid data in the modulo 10 check is n, whether or not the number of sequence data is n, and whether or not any two data of each of left block data and right block data in valid data of the modulo 10 check are the same as each other and outputs a reading valid signal when all these conditions are satisfied. Thus, only when any two data of each of left block data and right block data in valid data of the modulo 10 check are the same, all n rows are treated as sequence data. In this case, with a combination of left block data and right block data of n rows, data being read is treated as valid data in the modulo 10 check. As a result, the data being read is treated as validly read data.

The apparatus according to the present invention determines whether or not the number of valid data in the modulo 10 check is in the range from n+1 to a predetermined value and whether or not the number of sequence data is n and outputs a reading valid signal when all these conditions are satisfied. Thus, when the number of valid data in the modulo 10 check is in the range from n+1 to a predetermined value, if the number of sequence data is n, data being read is treated as validly read data. As a result, the reading ratio is improved.

The apparatus according to the present invention determines whether or not the number of valid data in the modulo 10 check is more than the predetermined value and outputs a reading invalid signal when the conditions are satisfied. Thus, when the number of valid data in the modulo 10 check is larger than the predetermined numbers of left block data and right block data of each of n rows, even if the number of sequence data is n, the number of data being read is excessive. Thus, data being read is treated as invalidly read data. As a result, the erroneously reading ratio is lowered.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A multiple-row bar code reading apparatus reading a multiple-row bar code having n rows, each of the n rows having a left block and a right block, said multiple-row bar code reading apparatus comprising:

a detecting and decoding circuit detecting and decoding the multiple-row bar code and producing a decoded signal;

a bar code data editing circuit, coupled to the detecting and coding circuit, extracting one bar code data from the decoded signal, performing modulo 10 check on the bar code data, and producing an edited result; and a determination circuit, coupled to the bar code data editing circuit, receiving the edited result and determining whether each of a first number of the right block data and a second number of the left block data is n, whether a third number of valid data in the modulo 10 check is n, whether a fourth number of sequence data is n−1, and whether any two data of each of the left block data and the right block data in valid data of the modulo 10 check are different from each other, and outputting a reading valid signal if the first number is n, the second number is n, the third number is n, the fourth number is n−1, and the any two data are different from each other.

2. The multiple-row bar code reading apparatus as set forth in claim 1, wherein said determination circuit determines whether a fifth number of valid data in the modulo 10 check is n, whether a sixth number of sequence data is n−1, whether a seventh number of one of the left block data and the right block data is n+1 and an eighth number of other block data is n, and one invalid data in the modulo 10 check differs from the other block data by one character in decoded values and outputs a reading valid signal if the fifth number is n, the sixth number is n−1, the seventh number is n+1, the eighth number is n and the one invalid data in the modulo 10 check differs from the other block data by one character in the decoded values.

3. The multiple-row bar code reading apparatus as set forth in claim 1, wherein said determination circuit determines whether a fifth number of valid data in the modulo 10 check is n and whether a sixth number of the left block data or the right block data is at least n+2 and outputs a reading invalid signal if the fifth number is n and the sixth number is at least n+2.

4. The multiple-row bar code reading apparatus as set forth in claim 1, wherein said determination circuit determines whether a fifth number of valid data in the modulo 10 check is n, whether a sixth number of sequence data is n−1, and whether each of a seventh number of the left block data and an eighth number of the right block data is at least n+1 and outputs a reading invalid signal if the fifth number is n, the sixth number is n−1, the seventh number is at least n+1 and the eighth number is at least n+1.

5. The multiple-row bar code reading apparatus as set forth in claim 1, wherein said determination circuit determines whether a fifth number of valid data in the modulo 10 check is n, and whether a sixth number of sequence data is n, and outputs a reading valid signal if the fifth number is n and the sixth number is n.

6. The multiple-row bar code reading apparatus as set forth in claim 1, wherein said determination circuit determines whether a fifth number of valid data in the modulo 10 check is in a range from n+1 to a predetermined value and whether a sixth number of sequence data is n, and outputs a reading valid signal if the fifth number is in the range from n+1 to the predetermined value and the sixth number is n.

7. The multiple-row bar code reading apparatus as set forth in claim 1, wherein said determination circuit determines whether a number of valid data in the modulo 10 check is a predetermined value or greater and outputs a reading invalid signal if the number is the predetermined value or greater.

8. A multiple-row bar code reading apparatus reading a multiple-row bar code having n rows, each of the n rows having a left block and a right block, said multiple-row bar code reading apparatus comprising:

a detecting and decoding circuit detecting and decoding the multiple-row bar code and producing a decoded signal;

a bar code data editing circuit, coupled to the detecting and decoding circuit, extracting one bar code data from the decoded signal, performing a modulo 10 check on the bar code data, and producing an edited result; and a determination circuit, coupled to the bar code data editing circuit, receiving the edited result and determining whether a first number of valid data in the modulo 10 check is n, whether a second number of sequence data is n−1, whether a third number of the left block data or the right block data is n+1 and a fourth number of other block data is n, and whether one invalid data in the modulo 10 check differs from the other block data by one character in decoded values, and outputting a reading valid signal if the first number is n, the second number is n−1, the third number is n, the fourth number is n and the one invalid data in the modulo 10 check differs from the other block data by one character in the decoded values.

9. A multiple-row bar code reading apparatus reading a multiple-row bar code having n rows, each of the n rows having a left block and a right block, said multiple-row bar code reading apparatus comprising:

a detecting and decoding circuit detecting and decoding the multiple-row bar code and producing a decoded signal;

a bar code data editing circuit, coupled to the detecting and decoding circuit, extracting one bar code data from the decoded signal, performing a modulo 10 check on the bar code data, and producing an edited result; and a determination circuit, coupled to the bar code data editing circuit, receiving the edited result and determining whether a first number of valid data in the modulo 10 check is n and whether a second number of either the left block data or the right block data is at least n+2 and outputting a reading invalid signal if the first number is n and the second number is at least n+2.

10. The multiple row bar code reading apparatus as set forth in claim 1, wherein said determination circuit determines whether a fifth number of valid data in the modulo 10 check is n, whether a sixth number of sequence data is n−1, and whether each of a seventh number of the left block data and an eighth number of the right block data is at least n+1 and outputting a reading invalid signal if the fifth number is n, the sixth number is n−1, and one of the seventh number and the eighth number is at least n+1.

11. A multiple-row bar code reading apparatus reading a multiple-row bar code having n rows, each of the n rows having a left block and a right block, said multiple-row bar code reading apparatus comprising:

a detecting and decoding circuit detecting and decoding the multiple-row bar code and producing a decoded signal;

a bar code data editing circuit, coupled to the detecting and decoding circuit, extracting one bar code data from the decoded signal, performing a modulo 10 check on the bar code data, and producing an edited result; and a determination circuit, coupled to the bar code data editing circuit receiving the edited result and determining whether a first number of valid data in the modulo 10 check is in a range from n+1 to a predetermined value and whether a second number of sequence data is n, and outputting a reading valid signal if the first number is in the range from n+1 to the predetermined value and the second number is n.

12. A multiple-row bar code reading apparatus reading a multiple-row bar code having n rows, each of the n rows having a left block and a right block, said multiple-row bar code reading apparatus comprising:

a detecting and decoding circuit detecting and decoding the multiple-row bar code and producing a decoded signal;

a bar code data editing circuit, coupled to the detecting and decoding circuit, extracting one bar code data from the decoded signal, performing a modulo 10 check on the bar code data, and producing an edited result; and a determination circuit, coupled to the bar code data editing circuit, receiving the edited result, determining whether a first number of valid data in the modulo 10 check is a predetermined value or greater and whether a second number of sequence data is n, and outputting a reading invalid signal if the first number is the predetermined value or greater, even if the second number is n, wherein data comprising sequence data and non-sequence data is read.

* * * * *

UNITED STATES PATENT AND TRADEMARK OFFICE
CERTIFICATE OF CORRECTION

PATENT NO. : 5,581,066
DATED : December 3, 1996
INVENTOR(S) : Motohiko ITOH, et al.

It is certified that error appears in the above-indentified patent and that said Letters Patent is hereby corrected as shown below:

TITLE PAGE [57] ABSTRACT

Line 4, after "data", insert --from--.

<u>Column 5</u>

Line 5, "no" should be --not--.

<u>Column 6</u>

Line 21, "modulo 10 check is not the detecting circuit" should be --modulo 10 check is n. The detecting circuit--.

<u>Column 7</u>

Line 3, "treat" should be --treats--.

<u>Column 10</u>

Line 12, "UL+LR UR+LL" should be --UL+LR and UR+LL--;

Line 19, after "requirements", insert --meet--.

<u>Column 16</u>

Line 13, "coding" should be --decoding--.

Signed and Sealed this

Eighteenth Day of February, 1997

Attest:

BRUCE LEHMAN

*Attesting Officer*      *Commissioner of Patents and Trademarks*